Jan. 5, 1954  L. W. BAHNEY  2,664,992
INSPECTION CONVEYER
Filed Feb. 25, 1950  5 Sheets-Sheet 1
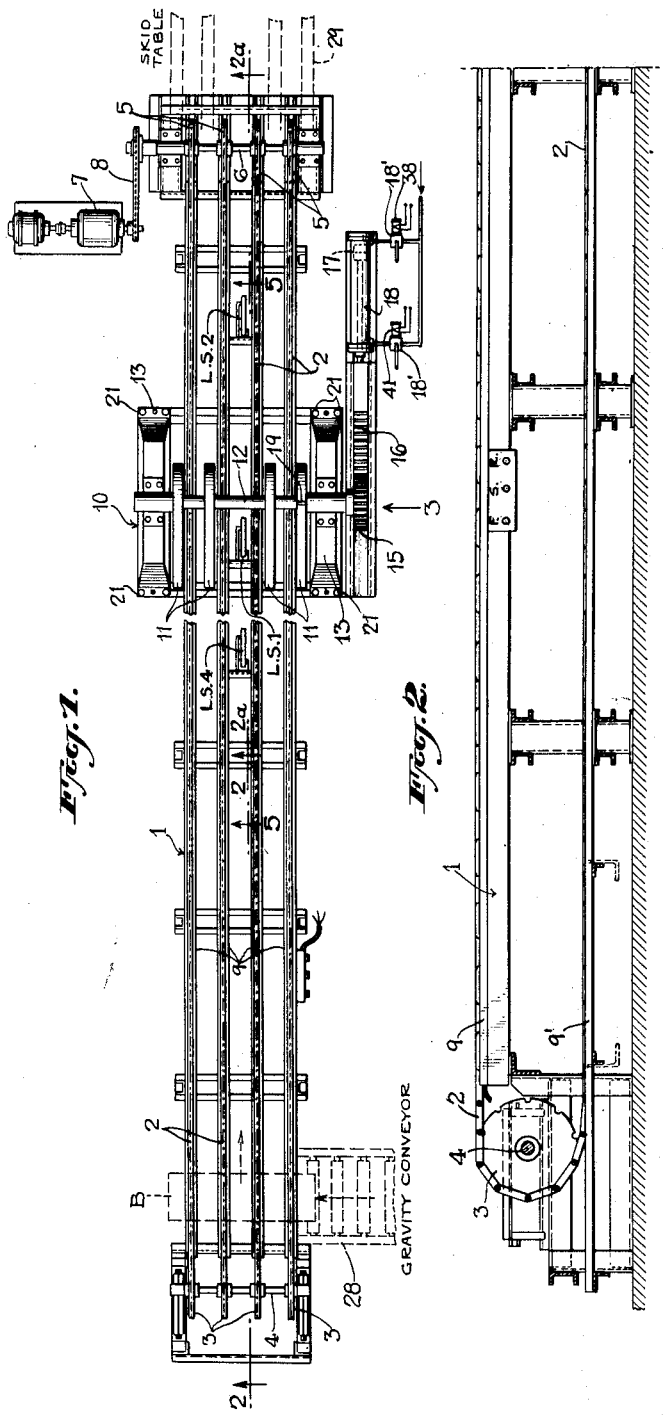
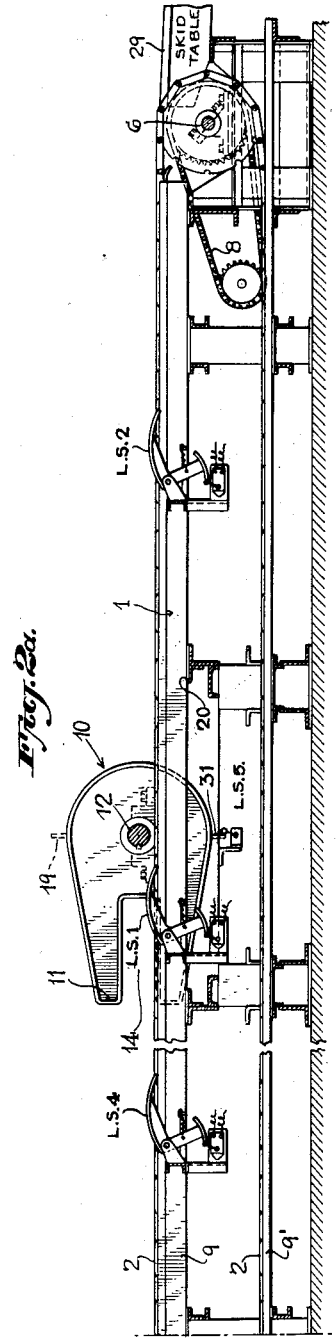
INVENTOR.
LUTHER W. BAHNEY.
BY
ATTORNEYS.

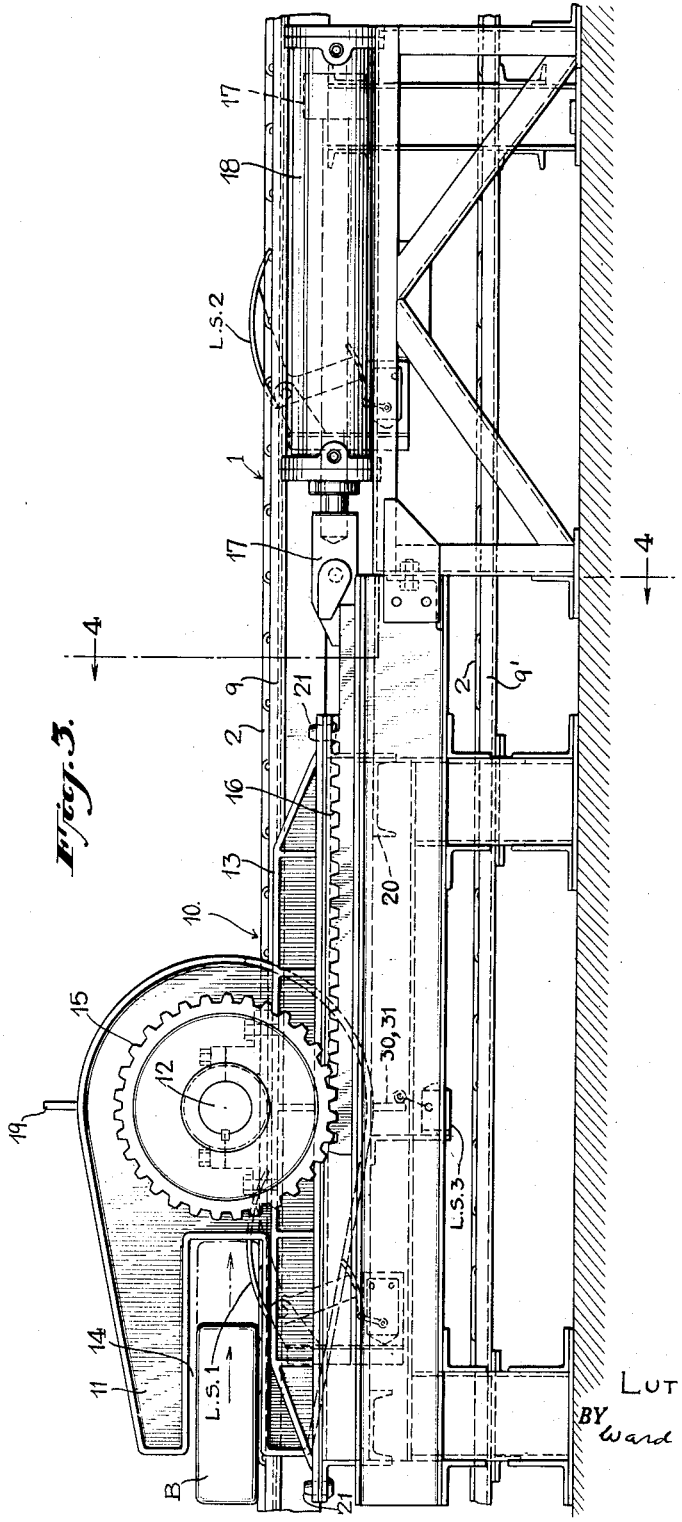

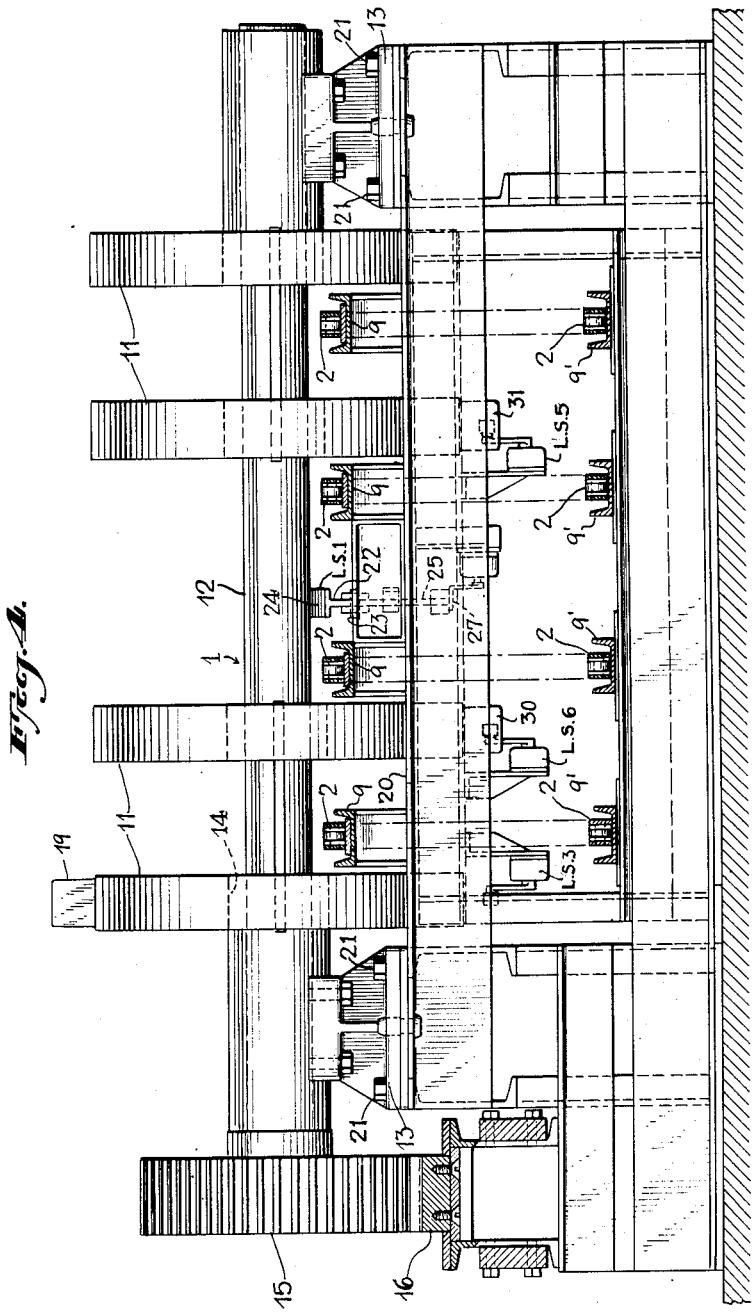

Jan. 5, 1954  L. W. BAHNEY  2,664,992
INSPECTION CONVEYER
Filed Feb. 25, 1950  5 Sheets-Sheet 4
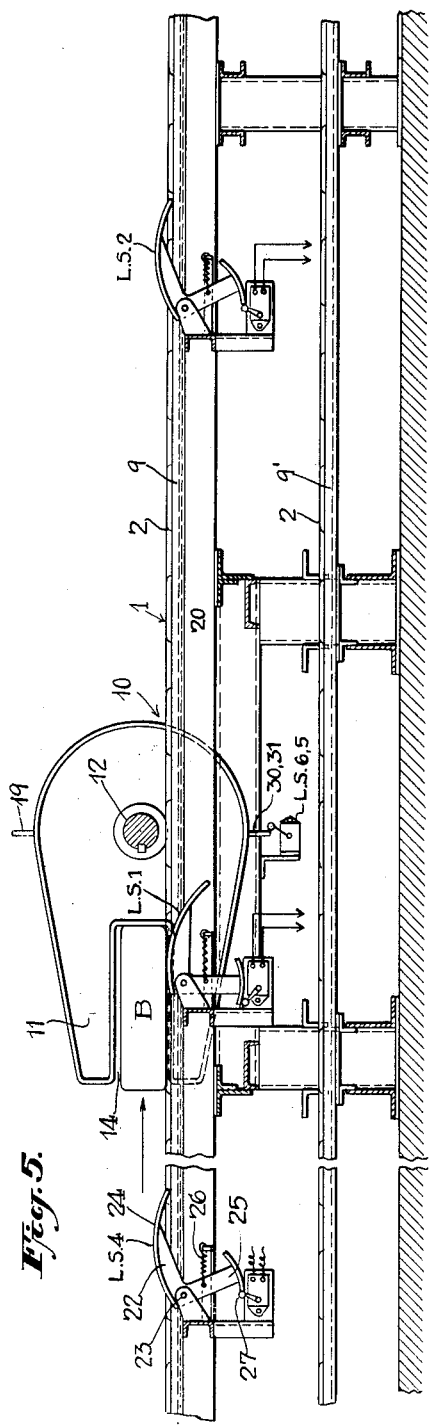
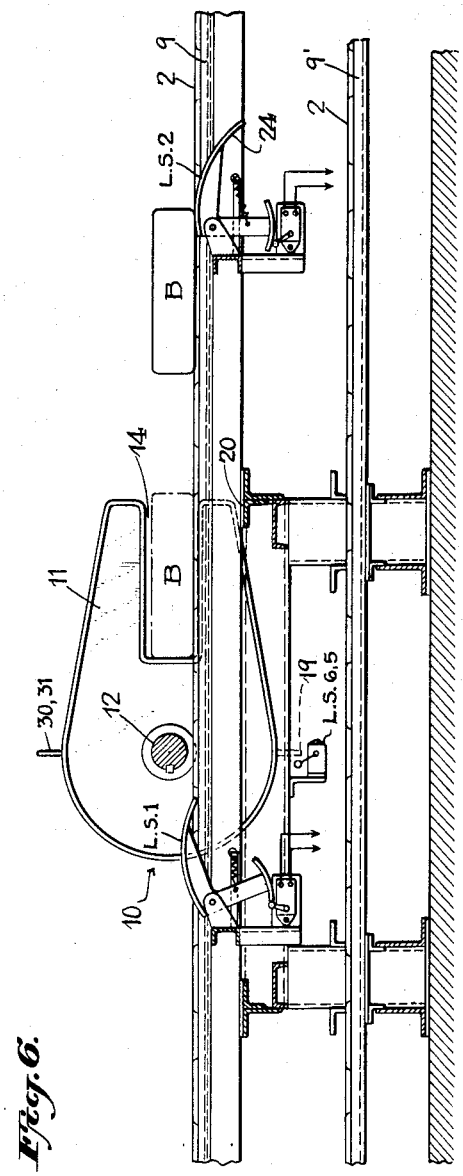
INVENTOR.
LUTHER W. BAHNEY.
BY
*Ward Crosby & Neal*
ATTORNEYS.

Jan. 5, 1954

L. W. BAHNEY 2,664,992

INSPECTION CONVEYER

Filed Feb. 25, 1950

INVENTOR.
LutherW. Bahney.
BY
ATTORNEYS.

Patented Jan. 5, 1954

2,664,992

UNITED STATES PATENT OFFICE 2,664,992

INSPECTION CONVEYER

Luther W. Bahney, Elizabeth, N. J., assignor to The American Metal Company, Limited, New York, N. Y., a corporation of New York Application February 25, 1950, Serial No. 146,280

5 Claims. (Cl. 198—33)

This invention relates to inspection conveyors and more particularly to a conveyor for conveying and enabling ready inspection of rectangular cast metal cakes or blocks and the like.

The object of the invention is to provide readily controllable and efficient means of the above character. Generally speaking, the machine in its preferred form comprises a horizontal endless conveyor for supporting and moving the blocks or castings and serving as an inspection bench, a turn over or capsizing device straddling the conveyor for turning the blocks bottomside up for inspection while on the conveyor, and means for actuating and controlling the movement of the conveyor and the capsizing device.

Inspection of such castings is needed to insure the necessary standard of quality, especially surface quality, before the cakes are delivered for processing, such as rolling to sheet form. The inspection procedure involves visual and other examinations of the whole surface of the casting, checking the measurements and appropriate non-destructive tests, together with corrective action if necessary, such as chiseling or grinding out defects and marking for grading, reject purposes and cropping.

In modern casting operations, particularly in continuous casting, it is advisable to do this inspection and correction work as the castings are produced, upon a suitable conveyor between the casting equipment and the storage facilities. It is obvious, therefore, that the cakes or castings must at some stage of this inspection be capsized, i. e. turned bottomside up, to allow the under surface of the cake as received on the conveyor, to be properly inspected and corrected if necessary. For heavy cakes and for safety reasons, a mechanical device to accomplish this capsizing is advisable. Hoists of various kinds which have been used for this purpose, are objectionable in that the cake is often allowed to fall on one side, resulting in injury to the surface quality and excessive shock to the conveying device or to the inspection bench. Other means which have been used to turn the cakes over, such as manual levers, involve extra labor resulting in high inspection cost. In the case of large cast cakes weighing more than one ton, which are at present in demand, such means and methods are impractical. For example, some of these castings are 9 ft. long by 26 inches wide and 4 inches thick.

A machine according to the present invention avoids the foregoing objections and provides readily controllable, positive capsizing action which will not injure the casting or the conveyor, and enables considerable saving in manual labor and time.

The drawings illustrate the present preferred form of the machine in which

Fig. 1 is a plan view of the machine with a section broken away;

Fig. 2 is an enlarged longitudinal sectional elevation taken on line 2—2 of Fig. 1;

Fig. 2a is an enlarged longitudinal sectional elevation taken on line 2a—2a of Fig. 1, with a part broken away;

Fig. 3 is an enlarged side elevation looking in the direction of the arrow on Fig. 1;

Fig. 4 is an enlarged cross-sectional elevation taken on line 4—4 of Fig. 3;

Fig. 5 is an enlarged longitudinal sectional elevation taken on line 5—5 of Fig. 1, with a section broken away;

Fig. 6 shows the capsizing or turn-over device in a position at 180° from that shown in Fig. 5.

Figure 7:
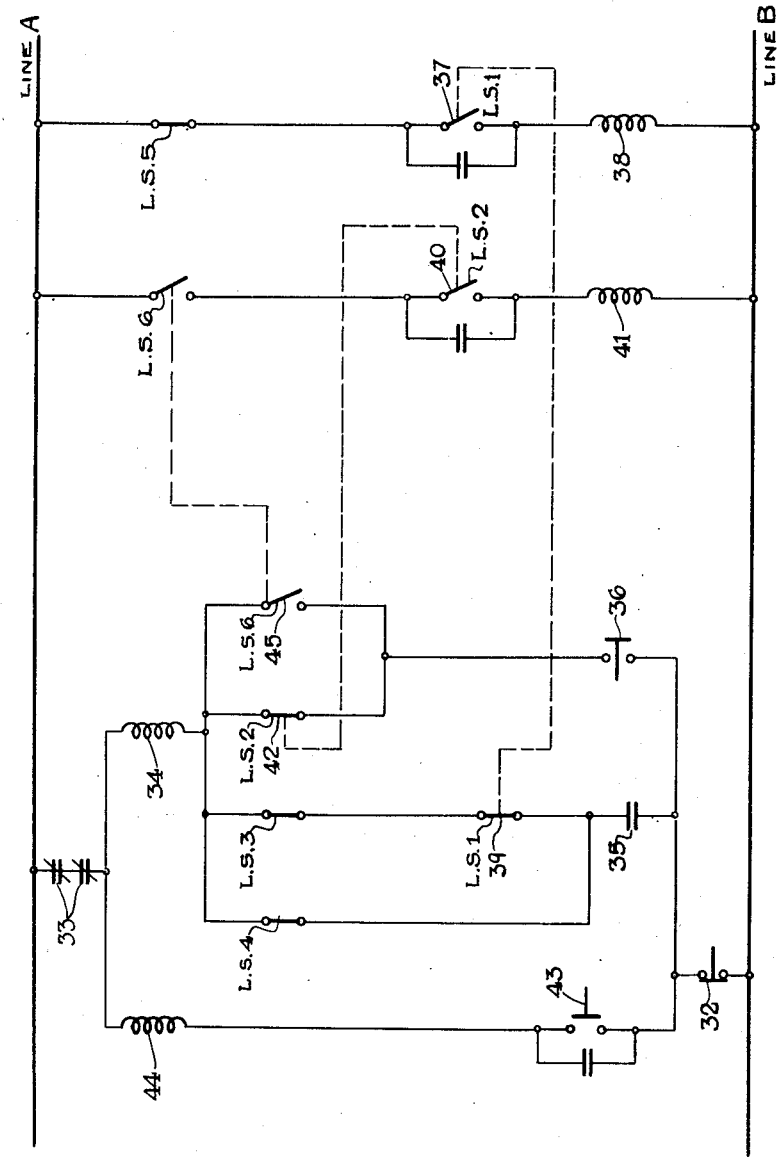
Fig. 7 illustrates a simplified schematic diagram of circuits for controlling the operation of the apparatus.

The conveyor 1 mounted on a suitable frame comprises four parallel endless conveyor chains 2, which, at the left-hand side, mesh with individual chain sprockets 3 keyed to a common shaft 4, the chains at the other end of the conveyor meshing with sprockets 5 keyed to a shaft 6, the shaft being driven by a motor 7 through suitable gearing such as chain 8, the motor being controlled to start and stop the conveyor by suitable switches hereinafter mentioned. The top and bottom lengths of the chains are supported and guided by parallel grooves or guideways 9, 9'. The conveyor not only moves the metal block along the machine, but acts as an inspection bench for the block at the different inspection stages.

The capsizing or turn-over device 10 is located intermediate the ends of the conveyor and straddles the conveyor for receiving and turning the block B bottomside up as it is conveyed through the apparatus. The device comprises a plurality of parallel wheels 11 (preferably four of them) spaced apart side by side and secured together on a shaft 12 to rotate as a unitary structure. The shaft is mounted in bearings carried by a frame 13, the shaft being set transversely of and just above the carrying surface of the chains.

Each wheel is shaped so as to contain a deep recess 14 adapted to receive the cast block (Figs. 3 and 5) with its principal surfaces parallel to those of the recesses. The recesses of the four wheels are in alignment transversely of the conveyor and act as a single recess for receiving the block. The recesses, when their long dimensions are horizontal, have their lower surfaces slightly below the top plane of the conveyor, i. e., substantially in the plane of the top of the conveyor. When the block enters the recesses the weight is carried by the chain conveyor until the wheels begin to rotate and the weight is again transferred to the conveyor chains just before the rotation of the wheels stops. The wheel and recess dimensions are such that more than half of the cast block may be within the recesses with suitable clearance.

The wheels are adapted to be rotated by suitable mechanism back and forth through a maximum movement of 180°. The preferred means for rotating the wheels comprises a gear 15 keyed to shaft 12 and meshing with a sliding rack 16 secured at one end to a piston 17 (Fig. 3) operating in a hydraulic cylinder 18; the maximum movement of the rack being set to rotate the wheels through 180°, the wheel recesses being horizontal at the beginning and end of the rotation. The hydraulic cylinder and piston may be of any suitable construction and the piston is moved back and forth by admitting oil to the cylinder by means of valves 18' actuated by solenoids controlled by switches hereinafter described.

In order to positively limit the forward throw or rotation of the wheels to 180° and relieve the hydraulic actuating apparatus of any strain, the wheels engage and rest on a member of the frame 20 (Figs. 2a, 5 and 6).

The frame 13 carrying the wheel turn-over assembly is so arranged and constructed that the whole assembly may be readily lifted from the conveyor apparatus by loosening certain bolts 21 shown more clearly in Fig. 4, so as to enable the conveyor to be otherwise used, as for example, when shapes such as billets not requiring capsizing are being cast and inspected.

The travel of the conveyor and the rotation of the capsizing or turn-over wheels are controlled by a series of switch-tripping devices LS-1, LS-2, LS-4 located along the path of movement of the conveyor so as to be engaged by the block as it moves along the machine. These switch-tripping devices, except for the particular shape of the block-engaging surfaces, are per se, old and are of substantially the same construction, so I will only describe one of them, as more clearly shown in Figs. 5 and 6. The devices comprise a bell crank lever 22 pivoted at 23 and having a curved portion 24 adapted to be engaged and depressed by the metal block as it moves along on the conveyor. This engagement swings the lower arm 25 of the bell crank to the left against the tension of a spring 26, whereupon this arm will engage a projection 27 for actuating an electric switch which may open a circuit to motor 7 driving the conveyor, or may close a circuit to solenoids operating valves 18' controlling fluid pressure to the cylinder 18 to control the rotation of the turn-over wheels as the case may be; as will be more fully explained in connection with the operation of the machine and in connection with the circuit diagram of Fig. 7.

Push buttons F S R (Fig. 2) are provided for operating motor 7, forward, reverse, and stop.

At the left-hand side of Fig. 1 is shown, in dotted lines, a schematic illustration of a gravity conveyor 28 for delivering the metal blocks or cakes to the chain conveyor at right angles to the path of the latter conveyor so that the blocks will lie broadside on on the chain conveyor. Such gravity conveyors are well known and form no part of my invention. At the right-hand side of Fig. 1 is shown, in dotted lines, a schematic representation of a skid table 29 for receiving the inspected blocks as they leave the machine, and this likewise forms no part of my invention.

Referring to Fig. 1 a block B to be inspected is shown as having been delivered by the gravity conveyor 28 to the chain conveyor 1, and is positioned broadside thereon. The chain conveyor is operating at this time and moves the block to a position where it is to have its first inspection. At this point, the operator presses a button to stop the conveyor. After the casting has been inspected, the operator pushes a button to start the conveyor and the casting moves along until it strikes a switch-tripping device LS-4 which stops the conveyor if either or both of the switch-tripping mechanisms LS-1 and LS-3 are open indicating that the rollover is not in a position to receive a block. With the rollover in position to receive a block, the operation of LS-4 by the block will not stop the conveyor motor since LS-3 is held closed by the rollover, LS-1 being normally closed. The LS-3 tripping device is operated by the lug 19 on the rollover such that when the latter is not in a position to receive a block, the contact of LS-3 is open whereby the conveyor motor circuit will be interrupted upon the operation of LS-4 by the block.

As the block enters the rollover, the switch-tripping device LS-1 is engaged to control the flow of fluid pressure into the cylinder 18 to move the rack 16 and rotate the rollover 180° to turn the block upside down, as shown in Fig. 6. The cap sized block now rests on the conveyor and moves out of the recesses to a point at which an inspection of the reverse side of the block is desired, at which point the operator presses a stop button to interrupt the conveyor motor circuit. After the inspection is completed, the operator presses a button to start the conveyor and the block is carried thereby until it engages a switch-tripping device LS-2 whereupon the circuit for actuating the hydraulic piston will be closed to restore the rollover device to its original position. Following engagement with LS-2, the block is moved along with the conveyor until it is discharged onto the receiving skids 29.

Referring now to Fig. 7 of the drawings, the operation of the machine and its control circuit will be described in detail. As the block to be inspected is delivered by the gravity conveyor 28 to the chain conveyor 1, it will be understood that the latter conveyor preferably is running such that the block will immediately be carried along to a point at which the first inspection thereof is to be had. When the block reaches this point, the operator presses a stop button 32 to interrupt the chain conveyor motor circuit. The chain conveyor motor circuit may be traced in Fig. 7 as follows: From power line A through the overload relays 33 for the motor starter, motor starter forward coil 34, the switch-tripping device LS-4 which is normally closed, the forward contact of the motor starter 35 and through the normally closed stop button 32 to power line B. As mentioned above, following the first inspection of the block, the operator may push the forward starting button 36 to close the conveyor motor circuit through contact 42 of the switch-tripping device LS-2 which is normally closed. The block then travels with the conveyor until it engages the switch-tripping device LS-4 and opens the contact thereof. At this time, the conveyor motor circuit may or may not be interrupted depending upon the position of the rollover. The switch-tripping device LS-3 is mounted on the conveyor frame in such a manner as to be controlled by the rollover, as shown in Figs. 3 and 4 of the drawings. That is, when the rollover is in a position to receive a block, as shown in Fig. 3, the contact of LS-3 is held closed by the rollover, so that even though the contact of LS-4 is opened by the engagement of the block therewith, a circuit is completed between power lines A and B for the conveyor motor through the closed contact of LS-3, the circuit being traced through the relays 33, forward coil 34 of the motor starter, contact of LS-3, contact 39 of LS-1 which is normally closed, forward contact 35 of the motor starter, and the normally closed stop button 32. Thus, with the rollover in position to receive the block, the motor conveyor circuit is not interrupted and the block is moved into the recesses of the rollover. However, should the rollover not be in a position to receive the block, the contact of LS-3 will be opened as will that of LS-4, as above explained, thereby to interrupt the motor circuit and bring the conveyor to rest until the rollover has been restored to its block receiving position, in which position the contact of LS-3 will be closed and the motor circuit completed.

As the block enters the recesses of the rollover, it engages the switch-tripping device LS-1 which has two contacts operating in the following manner. One contact 37 thereof closes a circuit through a switch-tripping device LS-5 mounted on the frame 13 and controlled by the lug 31 on the rollover, the contact of which is normally closed when the rollover is in its block receiving position, thereby to energize the coil 38 of a conventional solenoid and operate one of the hydraulic valves 18' to admit fluid into the hydraulic cylinder 18. When this occurs, the hydraulic piston will drive the rack 16 and rotate the rollover 180° into the position shown in Fig. 6 of the drawings. The other contact 39 of the switch-tripping device LS-1 is normally closed and is in series circuit with the switch-tripping device LS-3 so that when the block engages the LS-1 device its contact 39 opens and when the next succeeding block engages the switch-tripping device LS-4, the conveyor motor circuit will be interrupted since the rollover will not be in a position to receive this block. However, until the next succeeding block engages the switch-tripping device LS-4, the conveyor continues to move and will remove the block from the recesses of the rollover after the latter has been rotated through 180°.

In order to inspect the block in its capsized position, the operator need only press the stop button 32 to interrupt the motor circuit and following the inspection, the conveyor motor circuit may again be completed by pressing the forward button 36 in the manner heretofore described.

To restore the rollover to its initial block receiving position, the switch-tripping device LS-2 is positioned in the path of movement of the block on the conveyor. The switch-tripping device LS-2 also has two contacts, the first of which, indicated at 40 in the circuit diagram of Fig. 7, is closed when the block engages the switch-tripping device to complete a circuit through another switch-tripping device LS-6. The tripping device LS-6 is mounted on the rollover frame 13 and is controlled by the lug 30 on the rollover in such a manner that its contact will be closed as soon as the rollover starts moving out of its original block receiving position. The circuit thus closed through the LS-6 switch-tripping device by contact 40 of LS-2 energizes a coil 41 of another conventional solenoid thereby to operate the other hydraulic valve 18' which controls the operation of the hydraulic cylinder 18 and its associated piston to cause the rollover to be restored to its original block receiving position. The second contact 42 of the LS-2 switch-tripping device provides means for completing a circuit for the conveyor motor in the event that a succeeding block is resting on the LS-4 switch-tripping device, this circuit being traced through the motor starting relays 33, the forward starter coil 34, contact 42 of the LS-2 switch-tripping device, the forward button 36 which will be closed when this circuit is to be employed, and finally through the normally closed stop button 32.

In the event that it is desired to reverse the direction of rotation of the conveyor motor, a reversing button 43 is provided which when closed completes a circuit through another motor starting coil 44 which when energized reverses the direction of rotation of the conveyor motor.

It will be noted that the LS-6 switch-tripping device is provided with a second contact 45 which, when closed, completes a circuit for the conveyor motor in the event that a block is resting upon the LS-4 switch-tripping device, and a previous block, although it has been removed from the recesses of the rollover, has not yet engaged the LS-2 tripping device. Under these conditions, the block which is resting upon the LS-4 tripping device will interrupt the motor circuit, but the circuit to the motor may be completed through the contact 45 of the LS-6 tripping device by merely closing the forward button 36, it being understood as pointed out above, that the contact 45 of the LS-6 tripping device will be closed as soon as the rollover moves out of its original block-receiving position.

While I have described my invention in accordance with the preferred embodiment thereof, it will be obvious to those skilled in the art, after understanding my invention, that various modifications may be made therein, and I aim in the appended claims to cover such modifications as come within the spirit and scope of the invention.

What is claimed as new and desired to be secured by Letters Patent is:

1. In apparatus of the character described the combination of a flexible conveyor for conveying metal blocks and the like, means straddling the conveyor for receiving and turning the block bottomside up as it is conveyed through the apparatus, said means comprising a plurality of parallel wheels spaced apart side by side and secured together to rotate as a unitary structure with aligned recesses for receiving the block from the conveyor, means for rotating said wheels back and forth through 180°, a switch-tripping device adapted to be engaged by the block when it enters the recesses to actuate said last means to turn the block bottomside up, another switch-tripping device engaged by the block after it leaves the recesses for actuating said last means to return the wheels to their original position, and a switch-tripping device in advance of the turn-over wheels adapted to be engaged by the block on the conveyor before it reaches the turn-over wheels to stop the conveyor to protect the turn-over wheels if they should not be in position for receiving a block.

2. In apparatus of the character described, a conveyor for conveying metal blocks and the like in a predetermined direction, turn-over means straddling said conveyor and mounted intermediate the ends thereof for receiving a block from said conveyor at a first position along the length thereof, turning said block bottomside up and depositing said block on said conveyor at a second position along the length thereof, said turn-over means comprising a rotatable member having a fixed axis of rotation extending perpendicular to said predetermined direction and having a recess for receiving said block, means for rotating said member through substantially 180°, first control means at said first position operable by said block for causing operation of said rotating means and rotation of said member through substantially 180°, second control means beyond said second position operable by said block for causing further operation of said rotating means and restoration of said member, and means for stopping said conveyor when said recess is filled with a block comprising third control means ahead of said first position operable by a block and means at said first position operable by a block in said recess.

3. In apparatus of the character described, a conveyor for conveying metal blocks and the like in a predetermined direction, turn-over means straddling said conveyor and mounted intermediate the ends thereof for receiving a block from said conveyor at a first position along the length thereof, turning said block bottomside up and depositing said block on said conveyor at a second position along the length thereof, said turn-over means comprising a rotatable member having a fixed axis of rotation extending perpendicular to said predetermined direction and having a recess for receiving said block, means for rotating said member through substantially 180°, first control means at said first position operable by said block for causing operation of said rotating means and rotation of said member through substantially 180°, second control means beyond said second position operable by said block for causing further operation of said rotating means and restoration of said member, and means for stopping said conveyor when said turn-over means is not in position to receive a block comprising third control means ahead of said first position operable by a block and control means adjacent said turn-over means, said last-mentioned control means being operated by said turn-over means upon rotation thereof away from said first position.

4. In apparatus of the character described, a conveyor for conveying metal blocks and the like in a predetermined direction, turn-over means straddling said conveyor and mounted intermediate the ends thereof for receiving a block from said conveyor at a first position along the length thereof, turning said block bottomside up and depositing said block on said conveyor at a second position along the length thereof, said turn-over means comprising a rotatable member having a fixed axis of rotation extending perpendicular to said predetermined direction and having a recess for receiving said block, means for rotating said member through substantially 180°, first control means at said first position operable by said block for causing operation of said rotating means and rotation of said member through substantially 180°, second control means beyond said second position operable by said block for causing further operation of said rotating means and restoration of said member, and means for stopping said conveyor when said recess is filled with a block and when said turn-over means is not in position to receive a block comprising third control means ahead of said first position operable by a block, control means at said first position operable by a block in said recess and further control means adjacent said turn-over means, said further control means being operated by said turn-over means upon rotation thereof away from said first position.

5. In apparatus of the character described the combination of a flexible conveyor for conveying metal blocks and the like, means straddling the conveyor for receiving and turning a block bottom side up as it is conveyed through the apparatus, said means comprising a rotatable member with a recess for receiving the block from the conveyor, means for rotating said rotatable member back and forth through 180°, a switch tripping device adapted to be engaged by the block when it enters said recess to actuate said last-mentioned means to turn the block bottom side up, another switch tripping device engaged by the block after it leaves said recess for actuating said last-mentioned means to return the wheels to their original position, and a switch tripping device in advance of said rotatable member adapted to be engaged by a block on the conveyor before it reaches the rotatable member to stop the conveyor and to protect the rotatable member if it is not in position for receiving a block.

LUTHER W. BAHNEY.

References Cited in the file of this patent

UNITED STATES PATENTS

| Number | Name | Date |
|---|---|---|
| 1,360,106 | Forsstrom | Nov. 23, 1920 |
| 1,594,326 | Richter | July 27, 1926 |
| 2,498,740 | Miller | Feb. 28, 1950 |
| 2,506,087 | Kadell | May 2, 1950 |

FOREIGN PATENTS

| Number | Country | Date |
|---|---|---|
| 3,176 | Great Britain | Nov. 9, 1905 |
| 256,417 | Germany | Feb. 11, 1913 |